(12) United States Patent
Beverly et al.

(10) Patent No.: US 8,874,780 B2
(45) Date of Patent: Oct. 28, 2014

(54) DATA BUFFERING AND NOTIFICATION SYSTEM AND METHODS THEREOF

(75) Inventors: Harlan T. Beverly, McDade, TX (US); Charles A. Musta, Austin, TX (US)

(73) Assignee: QUALCOMM Incorporated, San Diego, CA (US)

(*) Notice: Subject to any disclaimer, the term of this patent is extended or adjusted under 35 U.S.C. 154(b) by 1156 days.

(21) Appl. No.: 11/778,124

(22) Filed: Jul. 16, 2007

(65) Prior Publication Data

US 2008/0016236 A1 Jan. 17, 2008

Related U.S. Application Data

(60) Provisional application No. 60/807,530, filed on Jul. 17, 2006.

(51) Int. Cl.
*G06F 15/16* (2006.01)
*G06F 15/173* (2006.01)
*G06F 9/54* (2006.01)

(52) U.S. Cl.
CPC ........................ *G06F 9/54* (2013.01)
USPC ........................... 709/232; 709/219; 709/223

(58) Field of Classification Search
CPC ..... G06F 9/54; H04L 67/289; H04L 67/2842; H04L 49/90
USPC ................... 709/234, 219, 223, 232
See application file for complete search history.

(56) References Cited

U.S. PATENT DOCUMENTS

| | | | |
|---|---|---|---|
| 5,353,412 A | 10/1994 | Douglas et al. | |
| 5,355,371 A | 10/1994 | Auerbach et al. | |
| 5,675,736 A | 10/1997 | Brady et al. | |
| 5,740,370 A * | 4/1998 | Battersby et al. | 709/219 |
| 5,771,287 A | 6/1998 | Gilley et al. | |
| 5,828,903 A * | 10/1998 | Sethuram et al. | 710/53 |
| 5,890,963 A | 4/1999 | Yen | |
| 6,015,348 A | 1/2000 | Lambright et al. | |
| 6,240,517 B1 | 5/2001 | Nishioka | |
| 6,615,218 B2 | 9/2003 | Mandal et al. | |
| 6,625,661 B1 | 9/2003 | Baldwin, Jr. et al. | |

(Continued)

FOREIGN PATENT DOCUMENTS

| | | |
|---|---|---|
| DE | 10218795 | 11/2003 |
| JP | 10314451 | 12/1998 |
| JP | 2001246147 | 9/2001 |
| WO | 2004001615 A1 | 12/2003 |

OTHER PUBLICATIONS

PCT Search Report, Mar. 3. 2008, 10 pages.

(Continued)

*Primary Examiner* — Aaron Strange
(74) *Attorney, Agent, or Firm* — DeLizio Gilliam, PLLC

(57) ABSTRACT

An interceptor program at a computer device intercepts certain externally initiated communications intended for the peer program before those communications are placed on the network stack. Further, the interceptor program stores the received communications in a buffer in application space, rather than kernel space. The interceptor program can then intercept polling requests from the peer program inquiring if data for the peer program is located at the network stack, and provide the buffered communications to the peer program in response. Because the communications are stored in application space, rather than kernel space, the data can be rapidly provided to the peer program, improving the speed with which the program can respond to the client communications.

21 Claims, 5 Drawing Sheets

(56) References Cited

U.S. PATENT DOCUMENTS

| | | |
|---|---|---|
| 6,675,218 B1 | 1/2004 | Mahler et al. |
| 6,745,236 B1 | 6/2004 | Hawkins et al. |
| 6,763,371 B1 | 7/2004 | Jandel |
| 6,810,528 B1 | 10/2004 | Chatani |
| 6,908,389 B1 | 6/2005 | Puskala |
| 6,918,042 B1 | 7/2005 | Debry |
| 6,941,353 B1 | 9/2005 | Lane |
| 6,961,852 B2 | 11/2005 | Craft |
| 6,988,196 B2 | 1/2006 | Cromer et al. |
| 7,000,115 B2 | 2/2006 | Lewis et al. |
| 7,003,548 B1 | 2/2006 | Barck et al. |
| 7,046,680 B1 | 5/2006 | McDysan et al. |
| 7,065,756 B2 | 6/2006 | Barsness et al. |
| 7,139,780 B2 | 11/2006 | Lee et al. |
| 7,209,449 B2 | 4/2007 | Tang et al. |
| 7,249,109 B1 | 7/2007 | Silverbrook et al. |
| 7,274,702 B2 | 9/2007 | Toutant et al. |
| 2002/0078223 A1 | 6/2002 | Baldonado et al. |
| 2002/0180583 A1 | 12/2002 | Paatero et al. |
| 2002/0198932 A1 | 12/2002 | Wagner |
| 2003/0177187 A1 | 9/2003 | Levine et al. |
| 2003/0191857 A1 | 10/2003 | Terrell et al. |
| 2004/0068580 A1 | 4/2004 | Jo et al. |
| 2004/0230801 A1 | 11/2004 | Sueyoshi et al. |
| 2004/0246905 A1 | 12/2004 | Dunagan et al. |
| 2005/0107161 A1 | 5/2005 | Fujimoto et al. |
| 2005/0188073 A1 | 8/2005 | Nakamichi et al. |
| 2006/0015618 A1* | 1/2006 | Freimuth et al. .............. 709/226 |
| 2006/0075119 A1 | 4/2006 | Hussain et al. |
| 2006/0085557 A1* | 4/2006 | Ishijima ....................... 709/238 |
| 2006/0112136 A1* | 5/2006 | Shankar et al. ............... 707/102 |
| 2006/0251109 A1 | 11/2006 | Muller et al. |
| 2006/0253605 A1 | 11/2006 | Sundarrajan et al. |
| 2006/0259579 A1 | 11/2006 | Beverly |
| 2006/0259632 A1 | 11/2006 | Crawford et al. |
| 2006/0294234 A1 | 12/2006 | Bakke et al. |
| 2007/0005986 A1 | 1/2007 | Bernard et al. |
| 2007/0060373 A1 | 3/2007 | Beverly |
| 2007/0086343 A1 | 4/2007 | Kujawa et al. |
| 2007/0094643 A1 | 4/2007 | Anderson |
| 2007/0101408 A1 | 5/2007 | Nakhjiri |
| 2007/0162639 A1* | 7/2007 | Chu et al. ........................ 710/22 |
| 2007/0189517 A1 | 8/2007 | Koseki et al. |
| 2007/0226498 A1 | 9/2007 | Walmsley et al. |
| 2007/0297405 A1 | 12/2007 | He |
| 2007/0298879 A1 | 12/2007 | Kobayashi et al. |
| 2008/0009337 A1 | 1/2008 | Jackson et al. |
| 2008/0009352 A1 | 1/2008 | Aoyama et al. |
| 2008/0010371 A1 | 1/2008 | Yamamoto et al. |
| 2008/0013551 A1 | 1/2008 | Scholl |
| 2008/0016236 A1 | 1/2008 | Beverly et al. |
| 2008/0022389 A1 | 1/2008 | Calcev et al. |
| 2008/0039208 A1 | 2/2008 | Abrink et al. |
| 2008/0045285 A1 | 2/2008 | Fujito |
| 2008/0049621 A1 | 2/2008 | McGuire et al. |

OTHER PUBLICATIONS

EPO Search Report for Application No. 07812957.4 dated Feb. 9, 2011, 7 pages.

"Korean Patent Application No. 2009-7003187, KIPO Notice of Grounds for Rejection", Oct. 25, 2013, 8 pages.

* cited by examiner

DATA BUFFERING AND NOTIFICATION SYSTEM AND METHODS THEREOF

CROSS REFERENCE TO RELATED APPLICATIONS

This application claims priority to U.S. Provisional Patent Application No. 60/807,530, entitled "METHOD AND SYSTEM FOR PROACTIVE DATA NOTIFICATION AND RECEPTION," filed on Jul. 17, 2006, which is assigned to the current assignee hereof and are incorporated herein by reference in its entirety.

FIELD OF THE INVENTION

The present disclosure relates generally to data communications, and more specifically to a system and method for managing received data at a computer device.

BACKGROUND

In recent years, several applications have been developed that rely on timely and effective interactions between two or more elements of a communication network. For example, in the sphere of online gaming, hundreds or thousands of game clients executing on user machines may be interacting with a central server executing on a networked computer. With such an architecture, a game server program is frequently tasked with providing content to clients, receiving client requests, processing those requests, responding to those requests, and synchronizing those requests with the requests of other clients. One factor that can affect the server programs ability to timely respond to client requests is the speed at which the server program can be notified that it has received data from the client, and the speed with which the data can be provided to the server program. One conventional method is for the server program to periodically poll the network stack of the server operating system to determine if data has been received. However, this method can take an undesirable amount of time, resulting in an undesirable delay in the server program responding to client requests. Furthermore, the speed at which a client program can be notified that it has received data from the server, and the speed with which the data can be provided to the server program can also cause undesirable delay. Similar problems can occur in peer-to-peer networks, resulting in undesirable delays in communications between programs at computer devices in the peer-to-peer network.

In the gaming context, this can result in distracting events such as game freezes, stuttering, warping, etc. As such, a need exists for an improved processing system and method that manages received data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION

Figure 1:
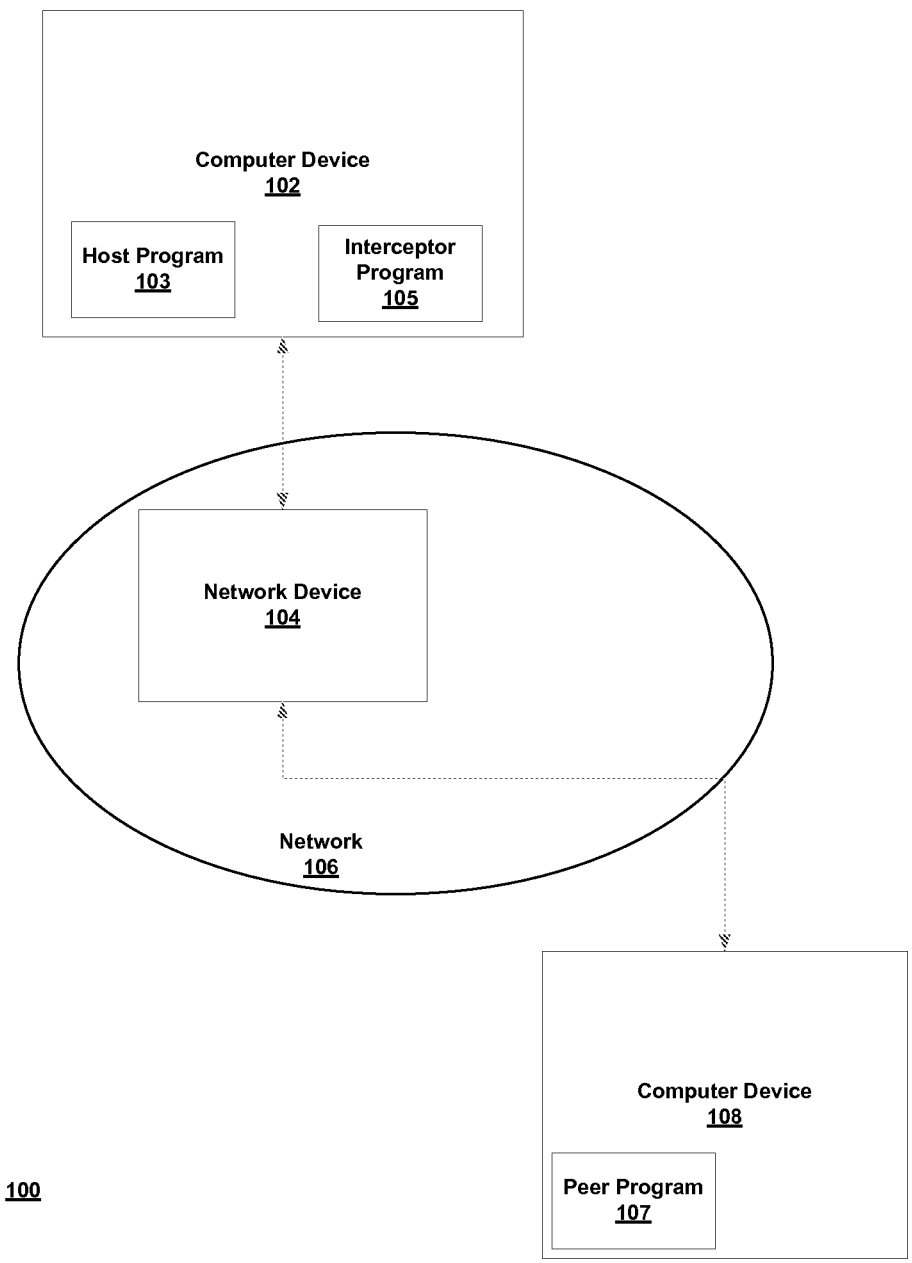
FIG. 1 is a block diagram of a particular embodiment of a network arrangement incorporating teachings of the present disclosure.

Embodiments discussed below describe, in part, distributed computing solutions that manage all or part of a communicative interaction between network elements. In this context, a communicative interaction may be one or more of: intending to send information, sending information, requesting information, receiving information, or receiving a request for information. As such, a communicative interaction could be one directional, bidirectional, or multi-directional. In some circumstances, a communicative interaction could be relatively complex and involve two or more network elements. For example, a communicative interaction may be "a conversation" or series of related communications between a client and a server or computer devices in a peer-to-peer network—each network element sending and receiving information to and from the other. Whatever form the communicative interaction takes, it should be noted that the network elements involved need not take any specific form. A network element may be a node, a piece of hardware, software, firmware, middleware, some other component of a computing system, and/or some combination thereof.

Though much of the following discussion focuses on specific problems associated with online gaming, the teachings disclosed herein may have broader applicability. As such, discussions relating to gaming issues like lag, game freezes, stuttering, warping, etc. are not intended to limit the scope of the disclosure. In addition, though the specific embodiment described in connection with FIG. 1 involves a Massively Multiplayer Online Game (MMOG), other interactive applications such as Video On Demand, entertainment distribution, information distribution, etc., may also be implemented in a manner that incorporates the teachings disclosed herein.

From a high level, a system incorporating teachings of the present disclosure may include a processor module that monitors communications between a computer programs at different computer devices in a network, such as a client program resident on a user machine and a server program resident on a computing device remote from the user, or a program at one device in a peer-to-peer network communicating with a program at another device in the network. In the case of a server/client architecture, the server program may be part of a two-tier architecture that is deployed in a hub and spoke or centralized server configuration. The server program may also be utilized in a less centralized model. For example, the server program may be implemented as one of two or more client programs that perform server-like functionality. For purposes of discussion herein, a program communicating with another program in the network is referred to herein as a peer program, and the device executing the peer program as a peer.

However the peer program is implemented, an interceptor program at the peer processor module may be utilized to intercept certain externally initiated communications intended for the peer program before those communications are placed on the network stack. Further, the interceptor program can be configured to store the received communications in a buffer in application space, rather than kernel space. The interceptor program can then intercept polling requests from the peer program inquiring if data for the peer program is located at the network stack, and provide the buffered communications to the peer program in response. Because the communications are stored in application space, rather than kernel space, the data can be rapidly provided to the peer program, improving the speed with which the program can respond to the client communications.

Alternatively, a device in the network or at the peer can monitor communications from another program in the network and determine when a communication targeted for the peer program has been received. In response, the device can initiate an interrupt at the peer. The interrupt handler for the interrupt accesses the interceptor program, which notifies the peer program that a communication for the peer program has been received, and provide the data to either the peer program or the interceptor program if the peer program is not yet ready for the data. As noted above, if the interceptor program is used to hold that data, it can respond with the data in user space rather than kernel space when the peer program is ready. Both methods reduce the latency in providing a received client communication to the peer program.

As indicated above, this application claims priority to U.S. Provisional Patent No. 60/807,530 filed on Jul. 17, 2006. The provisional application describes in part specific implementations of the teachings disclosed herein and is not intended to limit the scope of the claims attached below. The entirety of the provisional application is incorporated herein by reference.

Referring to FIG. 1, a block diagram of a particular embodiment of a network arrangement that includes a host program 103 executing at a host computing device 102, a network 106 including a network device 104, and a peer program 107 executing at a computing device 108. The actual location of the network device 104 may be modified in other deployments. For example, the network device may be implemented at the host computing device 102 as a network card, a processor dongle, a "Lan on Motherboard" processor, etc. In the embodiment of FIG. 1, network 106 may be a wide area network, such as the Internet, a local area network, or some other appropriate network or bus. Within arrangement 100, computing devices 102 and 108 may be similar or different. For example, computing device 108 may be a local user computer, a laptop, a cellular telephone, a gaming console, a workstation, or some other appropriate device, and host computing device 102 may be a peer computer, a workstation, a peer of computing device 108, or some other appropriate device.

In operation, the peer program 107 and the host program 103 may communicate with each other via the network 106, and in particular via the network device 104. In one embodiment, the peer program 107 and host program 103 may work together to provide a user of computing device 108 with an online experience. In operation, peer program 107 may receive content from computer device 102 and may occasionally send requests to host program 103 in an effort to affect the content being provided or to modify data at the host program 103. As shown, FIG. 1 includes only one device executing a peer program. In practice, however, host program 103 and computing device 102 may be providing content to many peers at or near the same time.

In operation, the peer program 107 may send communications or messages to the host program 103 to update information, request that tasks be performed, and the like. For example, the host program 103 can be an online banking application and the peer program 107 can be a web browser. The peer program 107 can send requests to the host program 103 to view account information, conduct transactions, and the like. In response, the host program 103 can determine if the requested tasks are authorized and, if so, execute the tasks. In another embodiment, the host program 103 is a server game program and the peer program 107 is a peer-side game program that provides a user with an online-gaming experience. In another embodiment, the host program 103 and the peer program 107 work together to provide a game simulation experience to two or more players at each computer device 102 and 106.

To communicate with the host program 103, the peer program 107 sends messages via the network 106, and in particular to the network device 104. Each message includes information, such as address information, indicating the location of the computer device 102. Each message also includes port information, indicating the target port of the computer device 102 with which the message is associated.

The network device 104 delivers messages from network to the computer device 102. In a particular embodiment, the computer device 102 also includes an interceptor program 105 that monitors message from the network device 104. If a message is not targeted to the host program 103, the interceptor program 105 provides the message to a network stack at the computer device 102 or to some other program to which the data is targeted. The network stack can subsequently be accessed by other programs (not shown) executing at the computer device 102 to retrieve the message, or the data is delivered to a different program (not shown). If the message is targeted for the host program 103 (for example, if the port targeted by the message is associated with the host program 103), the interceptor program 105 intercepts the message and stores it in a buffer for the host program 103. The buffer is "logically close" to the host program 103 so that it can be quickly accessed. Accordingly, when the host program 103 inquires (such as through a polling request) whether a message has been sent from a peer program 107, the interceptor program 105 receives the inquiry and provides a response more rapidly than the message could be retrieved from the network stack. Later, or at the same time as the polling request, if the data is requested by the host program 103, the data is delivered to the host program 103 more rapidly than the message could be retrieved from the network stack. Accordingly, the interceptor program 105 improves the communication efficiency between the peer program 107 and the host program 103. This reduces the likelihood of latency problems and provides for an improved user experience. Further, because the interceptor program 105 is located "between" the peer program 107 and the host program 103, it can be implemented without redesign of the host program 103 or the peer program 107. Accordingly, deployment of the interceptor program 105 is simplified. Additionally, in one embodiment the host program 103 is designed to frequently poll the network stack to check if a peer program 107 has transmitted data intended for the host program 103. These polling requests can cause additional processing power to be consumed slowing overall operation. Because the interceptor program 105 can hold buffers and data ready information logically close to the host program 103 and provide the polling answer more quickly, processing power at the computer device 102 is conserved.

In an alternative embodiment, some or all of the interceptor program 105 could reside in the network device 104. In this case the interceptor program 105 could use buffers which reside in the network device 104 to conserve the amount of buffer space needed in the computer device 102. The portion of the interceptor program 105 described above which has knowledge of if there is data available or not could still reside in user space, therefore giving similar improvements in polling. Buffered data could reside in the network device 104, and be transferred directly to the host program 103 when the data was requested by the host program 103. This method conserves memory usage in the computer device 102 and also conserves processing power when the host program 103 is polling for information if data is available or not.

In another alternative embodiment, the network device 104 provides an interrupt to the computer device 102 when a message targeted to the host program 103 is received. In response to the interrupt, the computer device 102 executes the interceptor program 105, which receives the message from the network device 104. The host program 103 may have outstanding receive commands and so would be immediately notified that the message has been received. Alternatively, the host program may poll or post a receive at some later time, at which point the data would be delivered as described above. In response, the host program 103 retrieves the message from the interceptor program 105.

Figure 2:
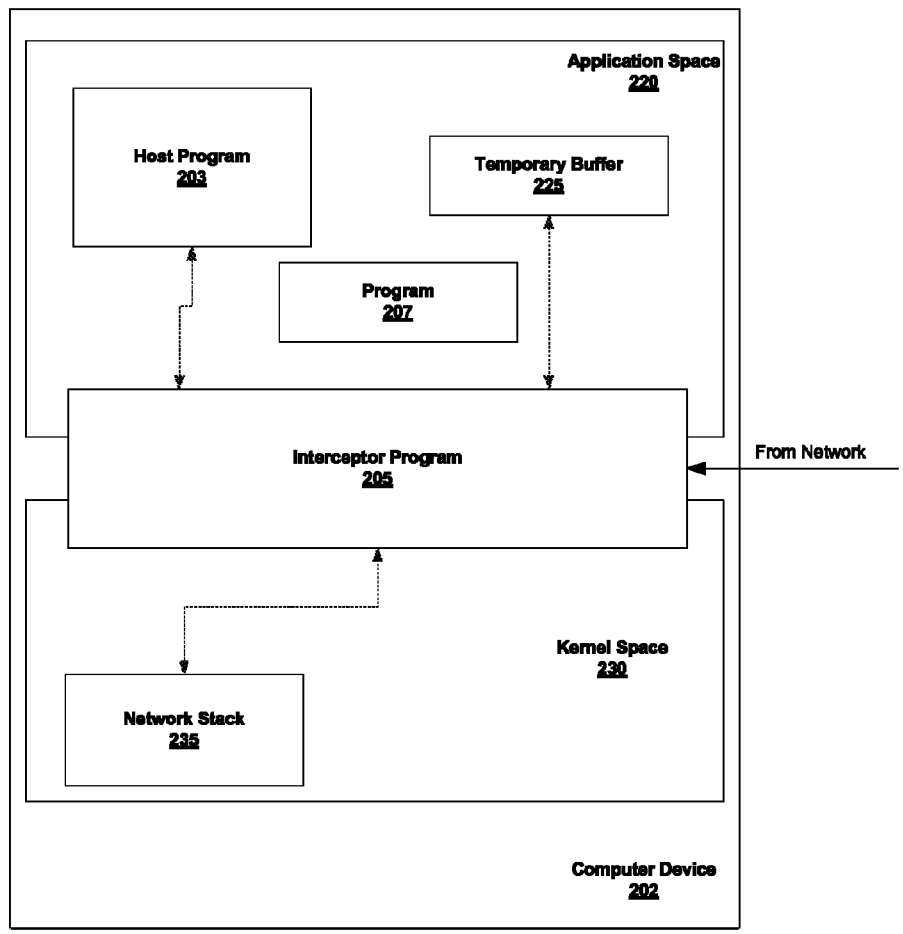
FIG. 2 is a block diagram of a particular embodiment of a computing device that incorporates teachings of the present disclosure.

Referring to FIG. 2, a block diagram of a particular embodiment of a computer device 202, corresponding to the computer device 102 of FIG. 1, is illustrated. The computer device 202 includes application space 220 and kernel space 230. As used herein, the term kernel space refers to memory address space that is typically only accessible by the kernel of an operating system at the computer device 202. Applications executing at the computer device 202 typically cannot access the kernel space directly, but instead must request information stored in the kernel space from the operating system kernel. Application space refers to memory address space that is accessible by applications at the computer device 202. Applications can typically access information stored in the application space 220 more quickly than information stored in the kernel space 230, because accesses to the application space 220 are not typically performed through the kernel. Note that both the kernel space 230 and the application space 220 can be virtual memory address spaces.

As illustrated, the application space 220 includes a host program 203, a program 207, and a temporary buffer 225. The kernel space 235 includes a network stack 235. The computer device 202 also includes an interceptor program 205 that, as illustrated, resides in both kernel space 235 and application space 220.

In operation, the network stack 235 is configured to store messages and other information received from the network 106. The network stack 235 is accessed by the kernel in response to requests from applications executing at the computer device 202. The kernel can determine if the network stack stores data for the requesting application and, if so, provide the data. Because the kernel typically executes a number of tasks in addition to accessing the network stack 235, accessing the network stack typically takes more time than an access to data stored in the application space 220.

The interceptor program 205 monitors messages received from the network 106. If a message is not targeted to the host program 203, the interceptor program 205 provides the message to the network stack 235 or to the program it is directed to, so that it is available for access by other programs at the computer device 202, such as the program 207. If the received message is targeted to the host program 203, the interceptor program stores the message in the temporary buffer 225 or an indication that the data is ready in the temporary buffer 225. In an alternative implementation a temporary data buffer is stored in kernel space 230 and only the indication that data is ready is stored in the temporary buffer 225. In yet another implementation, the indication that data is ready is stored in the temporary buffer 225, but the data itself is given to the network stack 235.

The interceptor program 205 also monitors communications between the host program 203 and the kernel to determine if the host program 203 is attempting to access the network stack 235. For example, the host program 203 may periodically poll the network stack 235 to determine if a message targeted to the program has been received from the network 106. The polling request to check the network stack 235 can be a poll request, a blocking select request, a non-blocking select request, a blocking receive request, a non-blocking receive request, or an asynchronous receive request, or any other such request as is used to determine if data is available. If the interceptor program 205 detects a polling request from the host program 203, it intercepts the request and determines if a message for the host program 203 is stored in the temporary buffer 225 or if the temporary buffer 225 indicates that data is ready to receive. If no message is stored in the temporary buffer 225 or there is no indication that data is ready to be received, the interceptor program 205 notifies the host program 203. If a message is stored in the temporary buffer 225, the interceptor program 205 either notifies the host program or when asked, provides the data to the host program 203. Because the temporary buffer 225 is located in application space 220, the interceptor program 205 is able to indicate whether or not there is data ready for the host program more quickly than it would be able to from the network stack 235. When the temporary buffer 225 also holds the data and is located in application space 220, the interceptor program 205 is able to provide the stored message more quickly than it would be provided by the kernel from the network stack 235.

Figure 3:
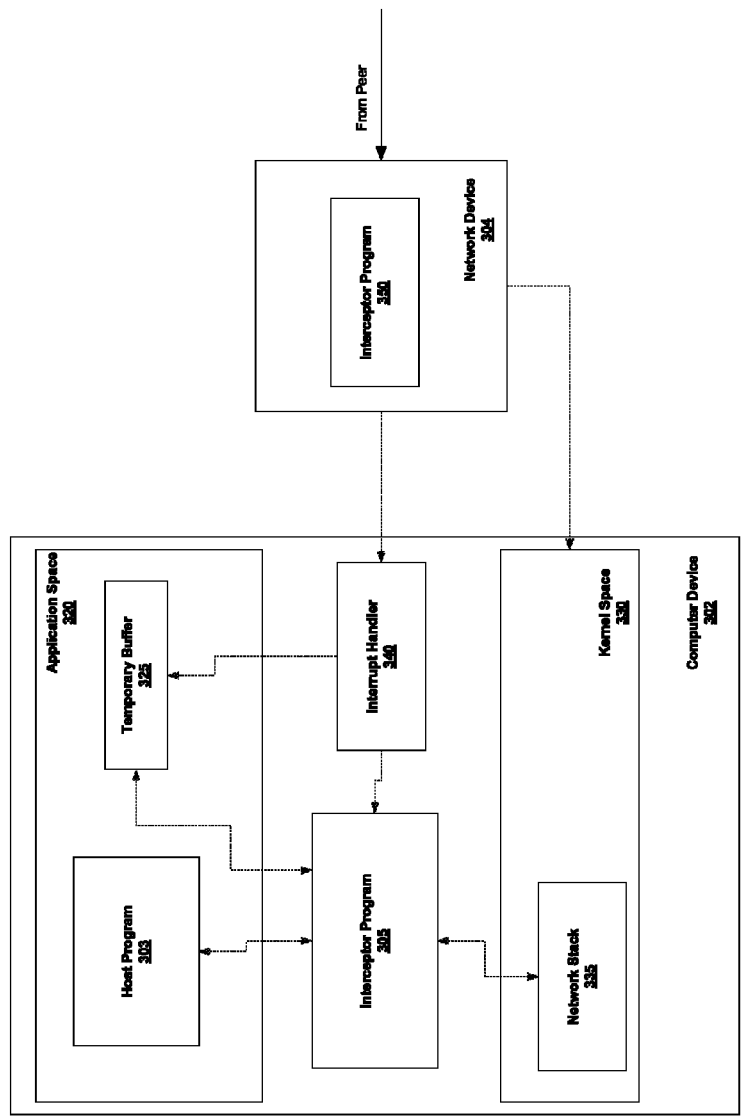
FIG. 3 is a block diagram of an alternative embodiment of a computing device and a network device that incorporates teachings of the present disclosure.

Referring to FIG. 3, a block diagram of a particular embodiment of a computer device 302 and a network device 304 are illustrated, corresponding to the computer device 102 and the network device 104, respectively, of FIG. 1. The network device 304 includes an interceptor program 350. The computer device 302 includes application space 320, kernel space 330, an interceptor program 305, and an interrupt handler 340. The application space 320 includes a host program 303 and a temporary buffer 325. The kernel space 330 includes a network stack 335.

In operation, the network device 304 receives messages from the peer program 107 via the network 106. The interceptor program 350 monitors messages received from the network 106 and determines which of those messages are targeted to the host program 303. The interceptor program 350 provides messages not targeted to the host program 303 to the network stack 335 of the computer device 302 or to a different program (not shown). If a message is targeted to the host program 303, the network device 304 can send an interrupt indicator to the computer device 302. In response to the interrupt indicator, the computer device 302 invokes the interrupt handler 340, which stores an indication that the message has been received in the temporary buffer 325. The message itself can be stored in the temporary buffer 325, in another buffer (not shown) in application space 320, in kernel space 330, or in the network stack 335. In an alternative embodiment, the temporary buffer can be located at the network device 304.

In a particular embodiment, the interceptor program 305 accesses the temporary buffer 325 to determine that a message associated with the host program 303 has been received and notifies the host program 303 that the message is available. Further, the interceptor program can retrieve the message and provide it to the host program 303. Because the indication that the message has been received is not placed on the network stack 335, notification of the received message can be provided more quickly to the host program 303, thereby improving communication efficiency between the peer program 107 and the host program 103.

In an alternative embodiment, the interceptor program 305 intercepts polling requests from the host program 303 that are targeted to the network stack. In response to intercepting the polling request, the interceptor program 305 determines, based on the contents of the temporary buffer 325, whether a message targeted to the host program 303 has been received. If no message has been received, the interceptor program 305 responds to the polling request to indicate no message is available. If a message has been received, the interceptor program 305 retrieves the message (from the temporary buffer 325, from another buffer in application space, from a buffer in kernel space 330, or from the network stack 335) and provides the message to the host program 303. Because the interceptor program 305 does not access the kernel space 330 in order to determine whether a message is available, it can respond to poll requests from the host program 303 more quickly than if the requests were to proceed directly to the network stack 335.

Figure 4:
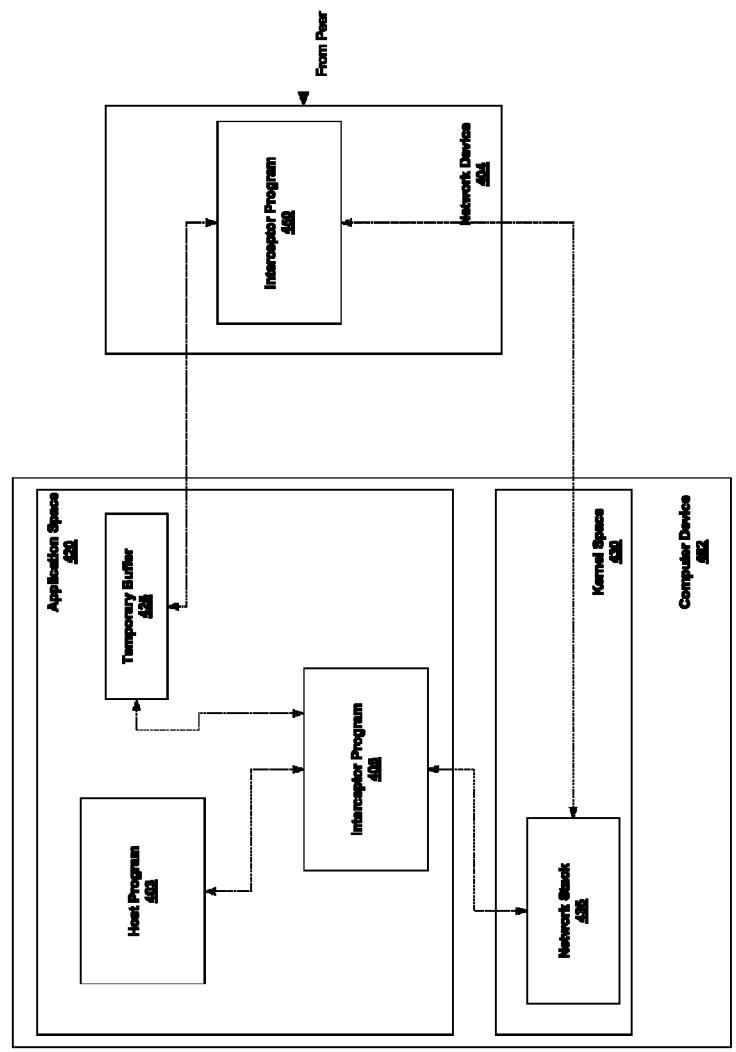
FIG. 4 is a block diagram of an alternative embodiment of a network device and a computing device that incorporates teachings of the present disclosure.

Referring to FIG. 4, a block diagram of a particular embodiment of a computer device 402 and a network device 404 are illustrated. The network device 404 includes an interceptor program 450. The computer device 402 includes application space 420 and kernel space 430. The application space 420 includes a host program 403, an interceptor program 405, and a temporary buffer 425. The kernel space 430 includes a network stack 435. The interceptor program 450 is configured to access the temporary buffer 425 and the network stack 435. The interceptor program 405 is configured to interface with the host program 403, the network stack 435, and the temporary buffer 425.

In operation, the network device 404 receives messages from the peer program 107 via the network 106. The interceptor program 450 monitors messages received from the network 106 and determines which of those messages are targeted to the host program 403. The interceptor program 450 provides messages not targeted to the host program 403 to the network stack 435 of the computer device 402 or to a different program (not shown). If a message is targeted to the host program 403, the interceptor program 405 can store the message or an indication that there is a new message available in the temporary buffer 425.

The interceptor program 405 monitors communications between the host program 403 and the kernel to determine if the host program 403 is attempting to access the network stack 435. For example, the host program 403 may periodically poll the network stack 435 to determine if a message targeted to the program has been received from the network 106. If the interceptor program 405 detects a polling request from the host program 403, it intercepts the request and determines if a message for the host program 403 is stored in the temporary buffer 425 or if the temporary buffer indicates that data is ready to receive. If no message is stored there or there is no indication that data is ready to be received, the interceptor program 405 notifies the host program 403. If a message is stored in the temporary buffer 425, the interceptor program 405 either notifies the host program or when asked, provides the data to the host program 403. Because the interceptor program 405 can determine whether a message is available for the host program 403 without accessing the network stack, it can respond to polling requests quickly, thereby improving the performance of the host program 403.

Figure 5:
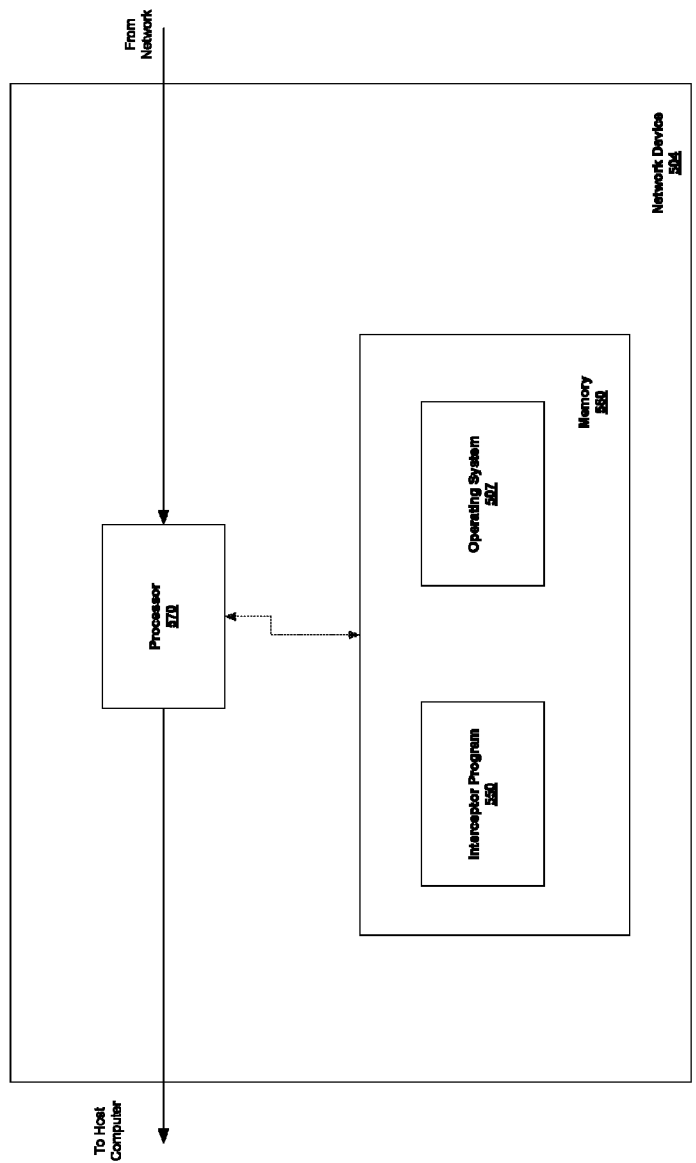
FIG. 5 is a block diagram of a particular embodiment of a network device that incorporates teachings of the present disclosure.

Referring to FIG. 5, a block diagram of a particular embodiment of a network device 504, corresponding to the network device 504, is illustrated. The network device 504 includes a processor 570 and a memory 560. The memory 560 is accessible to the processor 570. The processor 570 can be a microprocessor, microcontroller, and the like. The memory 560 is a computer readable medium that can be volatile memory, such as random access memory (RAM), or non-volatile memory, such as a hard disk or flash memory.

The memory 560 stores an interceptor program 550 and an operating system 507. The interceptor program 550 and the operating system 507 include instructions to manipulate the processor 570 in order to implement one or more of the methods described herein. Other programs, such as applications, can also be stored in the memory 560 to manipulate the processor in order to implement the described methods. It will be appreciated that the computer device 102 could be configured similarly to the network device 504, including a memory to store one or more programs to manipulate a processor to implement one or more of the methods described herein.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   determining by a second program that a first message received from a network is targeted for a first program at a host device;
   storing the first message in a temporary buffer in response to determining that the first message is targeted for the first program, the temporary buffer separate from a network stack at the host device;
   intercepting by the second program a first periodic polling request for the first message, the first periodic polling request targeted to the network stack and requesting an indication of whether data sent to the first program from a remote device has been received;
   in response to intercepting the first periodic polling request and in response to the second program determining the first periodic polling request is from the first program, retrieving, by the second program, the first message from the temporary buffer and providing the first message to the first program;
   intercepting a second periodic polling request from the first program; and
   in response to the second periodic polling request, providing an indication that data is not available to the first program based, at least in part, on data stored at the temporary buffer.

2. The method of claim 1, further comprising:
   determining that a second message received from the network is targeted for a third program at the host device; and
   storing the second message in the network stack at the host device.

3. The method of claim 2, further comprising:
   intercepting a third periodic polling request at the second program, the third periodic polling request targeted to the network stack and requesting an indication of whether data sent to the third program has been received; and in response to intercepting the third periodic polling request, providing, by the second program, the third periodic polling request to the network stack in response to determining the third periodic polling request is from the third program.

4. The method of claim 1, wherein the temporary buffer is located in application space.

5. The method of claim 1, wherein the network stack is located in kernel space.

6. The method of claim 1, wherein the first message is stored in the temporary buffer and not at the network stack.

7. The method of claim 1, wherein the first periodic polling request is selected from the group consisting of a non-blocking select request, a blocking select request, and an asynchronous select request.

8. The method of claim 1, further comprising providing the first message to the first program in response to an indication that the first message is available asynchronously.

9. The method of claim 1, wherein the first periodic polling request is selected from the group consisting of a non-blocking receive request, a blocking receive request, an asynchronous receive request.

10. The method of claim 1, further comprising:
receiving an interrupt request from a network device, the interrupt request indicating the first message has been received; and
notifying the first program that the first message has been received in response to receiving the interrupt request.

11. The method of claim 10, further comprising receiving the first periodic polling request in response to receiving the interrupt request.

12. The method of claim 1, wherein the first program is in application space, and wherein the second program is, at least in part, in application space.

13. The method of claim 1, wherein the first program is in application space and wherein the second program is in both kernel space and application space.

14. A non-transitory computer readable medium having stored thereon computer executable instructions that, when executed, cause a processor to perform operations comprising:
determining at a network device that a first message received from a network is targeted for a first program at a host device;
storing the first message at a temporary buffer at the host device in response to determining that the first message is targeted for the first program;
intercepting a first periodic polling request by a second program, the first periodic polling request targeted to a network stack and requesting an indication of whether data sent to the first program from a remote device has been received;
in response to intercepting the first periodic polling request and in response to determining the first periodic polling request is from the first program, retrieving, by the second program, the first message from the temporary buffer and providing the first message to the first program;

intercepting a second periodic polling request from the first program; and
in response to the second periodic polling request, providing an indication that data is not available to the first program based, at least in part, on data stored at the temporary buffer.

15. The non-transitory computer readable medium of claim 14, wherein the temporary buffer is located in application space.

16. The non-transitory computer readable medium of claim 15, wherein the network stack is located in kernel space.

17. The non-transitory computer readable medium of claim 14, further comprising instructions to provide an interrupt indication to the host device in response to determining that the first message is targeted for the first program at the host device.

18. The non-transitory computer readable medium of claim 14, wherein the first program is in application space, and wherein the second program is, at least in part, in application space.

19. The non-transitory computer readable medium of claim 14, wherein the first program is in application space and wherein the second program is in both kernel space and application space.

20. An apparatus comprising:
a processor;
a memory coupled to the processor, the memory organized into an application space and a kernel space; and
a computer readable storage device communicably coupled to the processor, the computer readable storage device storing instructions that, when executed by the processor, cause the processor to perform operations comprising:
determining by a second program executable by the processor that a first message received from a network is targeted for a first program executable by the processor, wherein the first program is in the application space, and wherein the second program is, at least in part, in the application space;
storing the first message in a temporary buffer in response to determining that the first message is targeted for the first program, the temporary buffer separate from a network stack;
intercepting by the second program a first periodic polling request for the first message, the first periodic polling request targeted to the network stack and requesting an indication of whether data sent to the first program from a remote device has been received; and
in response to intercepting the first periodic polling request and in response to the second program determining the first periodic polling request is from the first program, retrieving, by the second program, the first message from the temporary buffer and providing the first message to the first program.

21. The apparatus of claim 20, wherein the network stack is located in the kernel space.

* * * * *